US011853049B2

(12) United States Patent
Fries et al.

(10) Patent No.: US 11,853,049 B2
(45) Date of Patent: Dec. 26, 2023

(54) INTEGRITY MONITORING IN AUTOMATION SYSTEMS

(71) Applicant: Siemens Aktiengesellschaft, Munich (DE)

(72) Inventors: Steffen Fries, Baldham (DE); Rainer Falk, Poing (DE)

(73) Assignee: SIEMENS AKTIENGESELLSCHAFT

(*) Notice: Subject to any disclaimer, the term of this patent is extended or adjusted under 35 U.S.C. 154(b) by 363 days.

(21) Appl. No.: 16/623,480

(22) PCT Filed: Jun. 7, 2018

(86) PCT No.: PCT/EP2018/065003
§ 371 (c)(1),
(2) Date: Dec. 17, 2019

(87) PCT Pub. No.: WO2019/011539
PCT Pub. Date: Jan. 17, 2019

(65) Prior Publication Data
US 2020/0183374 A1 Jun. 11, 2020

(30) Foreign Application Priority Data

Jul. 10, 2017 (EP) .................................. 17180526

(51) Int. Cl.
*G06F 9/4401* (2018.01)
*G06F 8/61* (2018.01)
(Continued)

(52) U.S. Cl.
CPC ....... *G05B 23/0254* (2013.01); *G06F 21/552* (2013.01); *G06F 21/57* (2013.01);
(Continued)

(58) Field of Classification Search
CPC ........ G06F 21/04; G06F 21/57; G06F 21/552; G06F 21/64; G06F 21/554;
(Continued)

(56) References Cited

U.S. PATENT DOCUMENTS 5,621,158 A 4/1997 Kitamura et al.
8,375,438 B1 2/2013 Ten Brink
(Continued)

FOREIGN PATENT DOCUMENTS

CN 1382270 A 11/2002
CN 102760213 A 10/2012
(Continued)

OTHER PUBLICATIONS

Lee et al., FlexiCast: Energy-Efficient Software Integrity Checks to Build Secure Industrial Wireless Active Sensor Networks, 9 pages (Year: 2016).*
(Continued)

*Primary Examiner* — Thuy Dao
(74) *Attorney, Agent, or Firm* — Schmeiser, Olsen & Watts LLP

(57) ABSTRACT

Monitoring the integrity of industrial automation systems is provided. For example, a negative impact on integrity caused by unauthorized access should be identified. This is made possible by comparing state data which describe the operating state of the industrial automation system, with sensor data which describe an environmental influence of the automation system.

15 Claims, 4 Drawing Sheets

Figure 1:
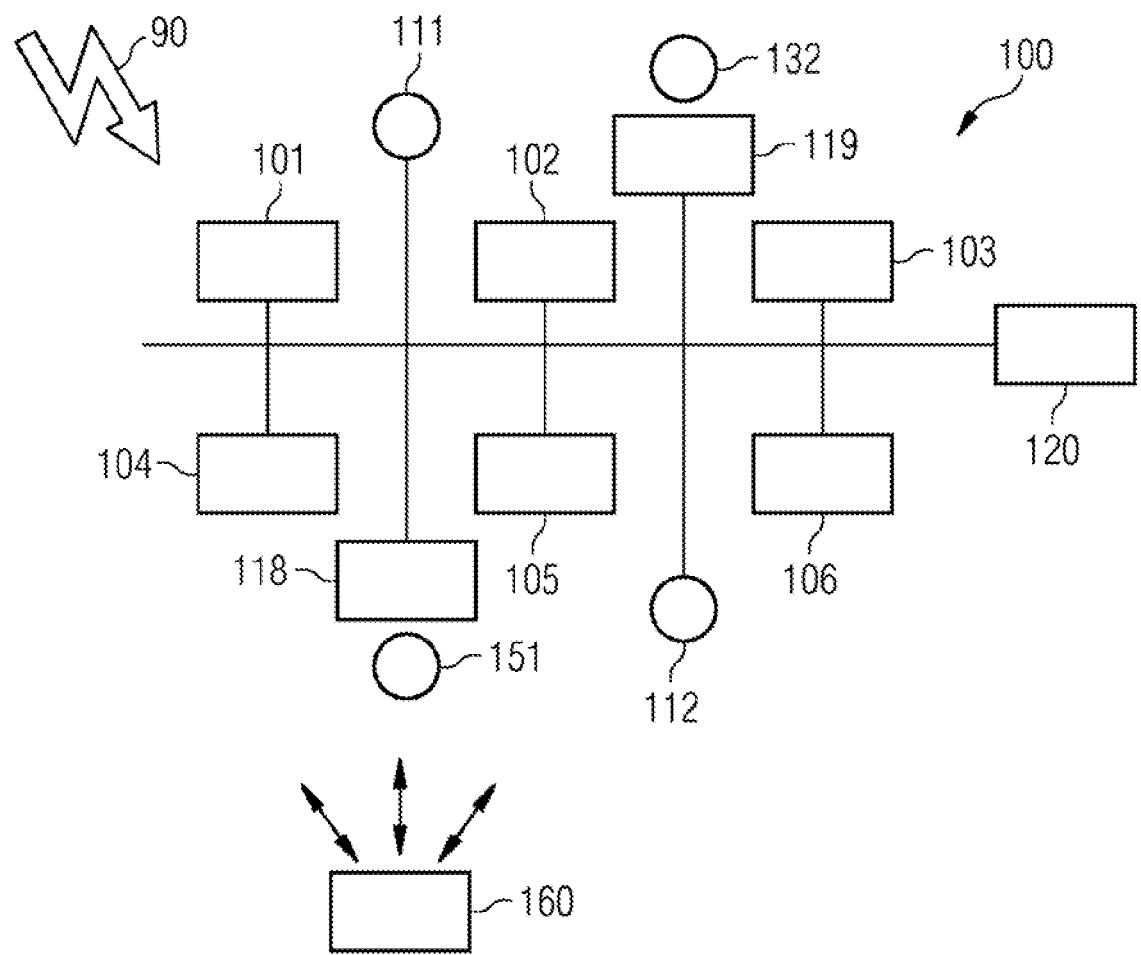

(51) Int. Cl.
*G06F 9/445* (2018.01)
*G06F 21/12* (2013.01)
*G06F 9/455* (2018.01)
*G05B 23/02* (2006.01)
*G06N 20/00* (2019.01)
*G06F 21/55* (2013.01)
*G06F 21/57* (2013.01)
*G06N 5/04* (2023.01)

(52) U.S. Cl.
CPC ............... *G06N 5/04* (2013.01); *G06N 20/00* (2019.01); *G06F 2221/034* (2013.01)

(58) Field of Classification Search
CPC .......... G06F 2221/034; G05B 23/0254; G05B 19/0428; G05B 19/4185; G05B 2219/23464; G05B 2219/33136; G06N 20/00; G06N 5/04; H04L 63/123; H04L 67/12; H04L 9/3297
See application file for complete search history.

(56) References Cited

U.S. PATENT DOCUMENTS

| | | | |
|---|---|---|---|
| 9,674,216 B2* | 6/2017 | Bußer | G06F 16/2365 |
| 11,093,258 B2* | 8/2021 | Zhao | G06F 9/4401 |
| 2001/0005821 A1 | 6/2001 | Ottosson | |
| 2004/0216000 A1 | 10/2004 | Koehler et al. | |
| 2005/0033987 A1 | 2/2005 | Yan et al. | |
| 2008/0155522 A1* | 6/2008 | Thresh | G06F 8/71 717/168 |
| 2009/0319060 A1* | 12/2009 | Wojsznis | G05B 17/02 706/47 |
| 2011/0078675 A1 | 3/2011 | Van Camp et al. | |
| 2013/0103353 A1 | 4/2013 | Kloeppner | |
| 2015/0276557 A1 | 10/2015 | Masuda et al. | |
| 2016/0034688 A1 | 4/2016 | Schoenemann | |
| 2016/0359866 A1* | 12/2016 | Mixer | H04L 67/12 |

FOREIGN PATENT DOCUMENTS

| | | |
|---|---|---|
| CN | 102971680 A | 3/2013 |
| DE | 10135586 A1 | 2/2003 |
| DE | 102014117282 A1 | 5/2016 |
| EP | 2980662 A1 | 2/2016 |
| EP | 3101491 A1 | 12/2016 |
| JP | H07160327 A | 6/1995 |
| JP | 6130460 B2 | 5/2017 |

OTHER PUBLICATIONS

Japanese Notice of Allowance for Application No. 2020-500871 dated Oct. 26, 2021.

PCT International Search Report dated Sep. 18, 2018 corresponding to PCT International Application No. PCT/EP2018/065003 filed Jun. 7, 2018.

* cited by examiner

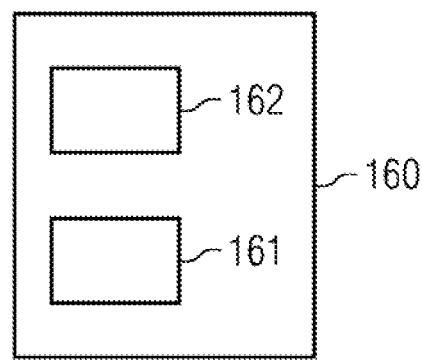
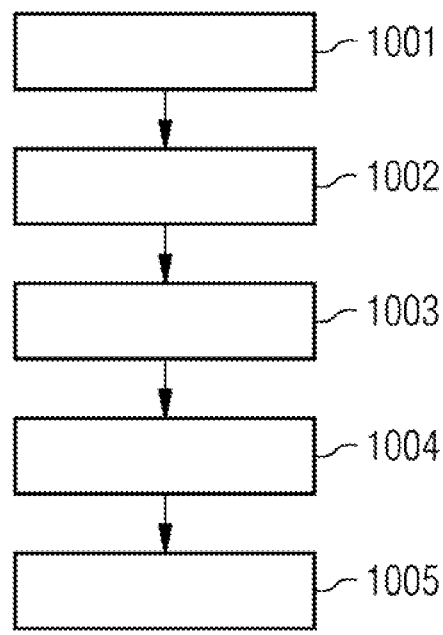

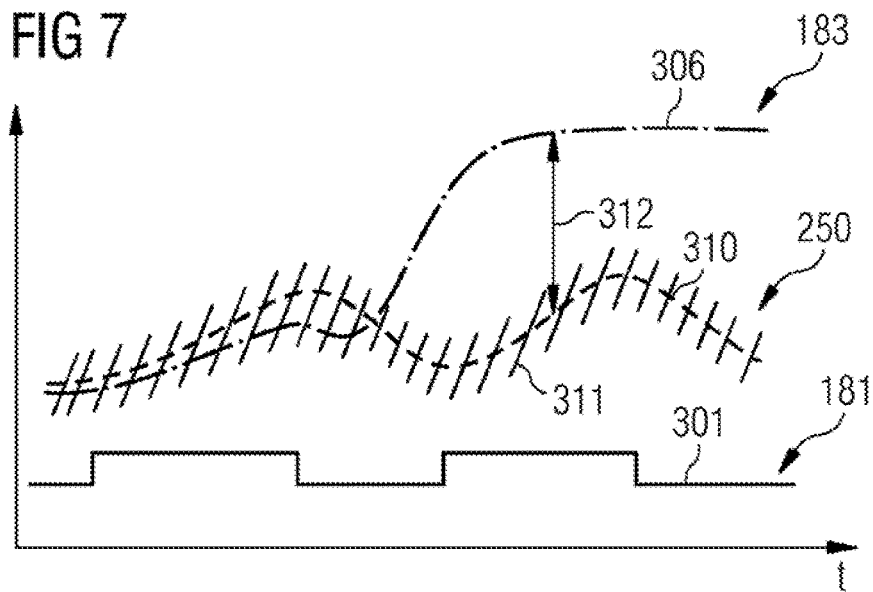
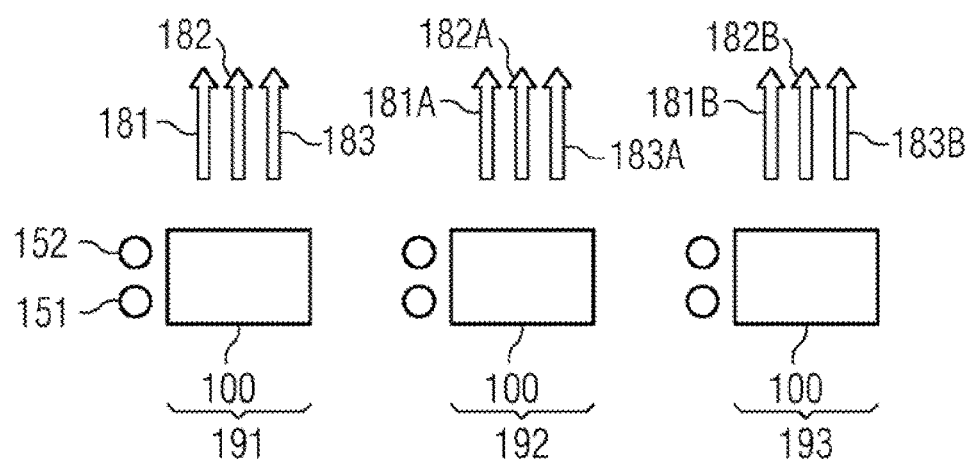
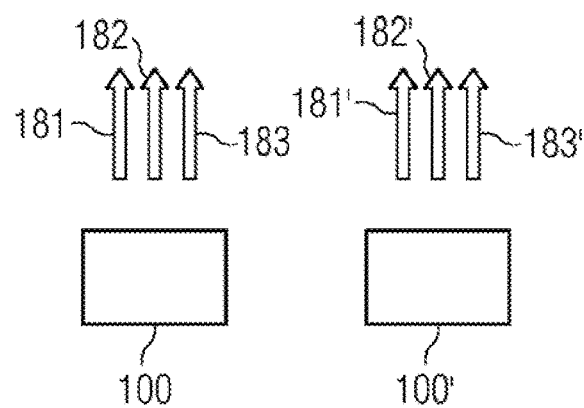

INTEGRITY MONITORING IN AUTOMATION SYSTEMS

CROSS-REFERENCE TO RELATED APPLICATIONS

This application claims priority to PCT Application No. PCT/EP2018/065003, having a filing date of Jun. 7, 2018, which is based on European Application No. 17180526.0, having a filing date of Jul. 10, 2017, the entire contents both of which are hereby incorporated by reference.

FIELD OF TECHNOLOGY

The following relates generally to monitoring the integrity of an industrial automation system, and more specifically to monitoring on the basis of a comparison between state data of the automation system and sensor data describing an environmental influence of the automation system. The integrity is monitored in order to ascertain impairment of the integrity on account of hacking.

BACKGROUND

With increasing automation, industrial automation systems are becoming increasingly widespread. By way of example, automation systems are used in the manufacture of machines or workpieces. Automation systems can implement process engineering installations. Industrial automation systems are also used in the field of traffic monitoring or traffic control, for example in association with traffic control systems in towns and cities, in building automation, in railroad traffic or in air traffic. Industrial automation systems can also be used in power generation, for example in power plants or transformer substations, and also in power transmission and power distribution (smart grid).

Modern automation systems exhibit a high degree of connectivity. By way of example, automation systems typically comprise a multiplicity of components, for example sensors, actuators, computing units or control units. These components of automation systems are typically connected to one another via a network and are thus in communication connection. It is often also possible for the automation system to be accessed from outside—for example via the Internet—or for an automation system to transfer data via the Internet, e.g. diagnosis data for predictive maintenance.

Therefore, in association with automation systems, there is often the risk of unauthorized hacking. Such unauthorized hacking can result in malfunctions, loss of data, functional limitations through to total failure of the corresponding automation system.

Therefore, protecting the integrity of automation systems is a required goal for ensuring reliable operation. In this case, there is a need, in particular, to protect the integrity of industrial automation systems as a whole, over and above the protection of individual partial functions of the automation systems.

In reference implementations, the impairment of the integrity on account of unauthorized hacking is monitored for example on the basis of state data of the IT systems of an automation system, the state data describing the operating state of the automation system. On the basis of an evaluation of such state data, an attack on the integrity of the IT components of the automation system can be ascertained. For example, it is possible to identify irregularities in the state data. The automation of the identification of such irregularities is described in association with intrusion detection tools (referred to as intrusion detection systems). Intrusion detection tools carry out a targeted search for known intrusion patterns, for example in the operating software of the automation system or in association with communication interfaces of the automation system.

However, such reference implementations have specific limitations and disadvantages. By way of example, such reference implementations may have a limited accuracy. Often such intrusion detection tools can only detect IT-related intrusions or manipulations.

SUMMARY

An aspect relates to improved techniques for monitoring the integrity of automation systems. In particular, there is a need for techniques for identifying hacking of automation systems. In this case, there is a need for such techniques which eliminate or alleviate at least some of the disadvantages and limitations mentioned above.

One exemplary method comprises obtaining state data of an industrial automation system. The state data describe the operating state of the automation system. The method furthermore comprises obtaining sensor data describing an environmental influence of the automation system. The method further comprises carrying out a comparison between the state data and the sensor data, and monitoring the integrity of the automation system on the basis of the comparison.

By way of example, it would be possible to identify hacking of the automation system and to monitor effects on the integrity that are associated therewith. Unauthorized hacking can be identified.

For example, the industrial automation system could implement a power plant, a power distribution network, a transformer substation, a production line for workpieces or machines, a refinery, a pipeline, a sewage or wastewater treatment plant, a traffic control system, a medical device or the like. Sometimes such an automation system is also referred to as a cyber-physical system (CPS). Examples of automation systems comprise: an industrial installation; a production hall; a transformer substation; a robot; an industrial truck; an autonomous transport system; a machine tool; a mill; a press; a process engineering installation; and a 3D printer.

The state data can comprise for example log files of operating software of the automation system. By way of example, the state data can originate from one or a plurality of controllers of the automation system. The state data could comprise: a self-test result of operating software of the automation system; checksums; memory dumps; etc.

The sensor data can be obtained from one or a plurality of sensors. The sensors can be for example part of the automation system, i.e. be in communication connection with further components of the automation system for example via a common communication interface. In other examples, however, it would also be possible for the sensors not to be part of the automation system, but rather to be kept available separately, such that it is not possible simply to obtain simultaneous access both to the automation system and to the sensors.

The sensor data can thus be indicative of the environmental influence of the automation system. A wide variety of sensors can be used here depending on the kind or type of environmental influence. By way of example, the environmental influence could comprise heating or cooling of the surroundings of the automation system; in such a case, it would be possible for temperature sensors to be used. In other examples, it would be possible for the environmental influence to comprise the switching of traffic lights or traffic guidance systems in general; here, for example, video data that image the traffic guidance systems could be obtained as sensor data. In association with power generation, by way of example, sensor data which are indicative of electrical characteristic variables, for instance voltage or current flow or phase shift, could be obtained.

In particular, a deviation of the environmental influence from an expected reference can be identified by carrying out the comparison between the state data and the sensor data. Such a deviation of the environmental influence can occur for example if boundary conditions of the environmental influence which are accounted for outside the automation system change. In such a case, it is not necessary to detect an impairment of the integrity. However, it would also be possible for such a deviation of the environmental influence from the reference to occur on account of, for example, unauthorized hacking of the integrity of the automation system. The unauthorized hacking can then be ascertained by monitoring the deviation.

A particularly high degree of reliability in the monitoring of the integrity can be achieved by the comparison between the state data and the sensor data. In particular, a positive confirmation of the integrity can be made possible by such joint analysis. Moreover, the integrity can be monitored on the basis of a multiplicity of data sources, with the result that overall the reliability increases. Hacking can be reliably identified. In particular, an effect of the hacking on the integrity can be identified. An impairment of the integrity can be identified. Unauthorized hacking can be identified. Furthermore, manipulations of the analog driving of an actuator or sensors of the automation system are also able to be identified, e.g. a manipulation of drive electronics. A new quality of the integrity monitoring is achieved as a result.

In one example, the state data could comprise a state of operating software of the automation system. In this way, it is possible to obtain IT-related information about the automation system. In particular, the state of the operating software can be characteristic of the operating state of the automation system.

The state data can comprise at least one element of the following group: a component registration of a multiplicity of active components of the automation system; a component activity of a multiplicity of components of the automation system; an error state of operating software of the automation system; a parameter of a communication interface of the automation system; and a resource allocation of computer hardware of the automation system.

By means of such and further kinds of state data, the state of the operating software of the automation system can be reliably and comprehensively mapped. By taking account of a plurality of complementary kinds of state data, it is possible to identify in particular an individual attack on individual functional blocks of the automation system. This is based on the experience that a simultaneous attack on a plurality or large number of functional blocks with a falsified, but coherent or consistent behavior occurs only rarely. Therefore, an impairment of the integrity for instance on account of hacking can be identified particularly reliably.

Such and further kinds of state data can in particular also be indirectly indicative of an activity of actuators of the automation system which bring about the environmental influence. It may sometimes be desirable to take account of the activity of the actuators of the automation system particularly explicitly during the monitoring of the integrity. In such a case, it may be useful furthermore to obtain control data for one or a plurality of actuators of the automation system, the actuators bringing about the environmental influence. The comparison can then be carried out between the state data, the sensor data and the control data.

In this way, it is possible to attribute a specific unexpected environmental influence particularly well for example also to malfunctions of the actuators; malfunctions of the actuators need not necessarily arise as a result of hacking, but rather can also be caused by damage, etc. Thus, overall the accuracy of the integrity monitoring can be increased. In particular, in this case it is possible to monitor the integrity of the system, also independently of hacking.

In some examples, it is possible for the comparison to take account of a deviation of the environmental influence from a reference. In particular, a deviation from the standard behavior can thus be ascertained in the context of the comparison. Such a deviation from the standard behavior can be determined particularly simply—in particular compared with reference implementations in which the environmental influence is intended to be comprehensively predicted. On account of the complexity of automation systems, sometimes it may not be possible or may be possible only to a limited extent to comprehensively predict the environmental influence. In such scenarios, it may then be useful if just a deviation of the environmental influence from the reference is taken into account instead of a prediction of the environmental influence. In other words, an anomaly detection can be carried out.

In this case, it would be possible, for example, for the reference to be determined on the basis of a predefined deterministic model and as a function of the state data. For example, the deterministic model could predefine the reference on the basis of simple assumptions which, for example, are fixedly predefined and stored in a memory. Such a model could predict, for example, that in the case of a large number of memory accesses of operating software of the automation system typically an increased number of workpieces completed per unit time will be obtained. The number of workpieces completely per unit time could be checked by a suitable sensor; in this way, an impairment of the integrity could be determined from a deviation between sensor data and state data. A further example of such a model concerns, for example, the frequency of regulating processes during operation of gas turbines; if a gas turbine is frequently regulated between different power values, the temperature in a bearing of the gas turbine could rise. The temperature profile in the region of the bearing of the gas turbine can be monitored by a temperature sensor and it is possible to check this predicted relationship in the context of the model by means of the comparison between the state data and the sensor data. Particularly if a simulation model of the automation system, which is also referred to as a digital twin, is present, then the simulation model can be used as reference during ongoing operation. This is advantageous in particular since a simulation model (digital twin) created during the design of the automation system can continue to be used for integrity monitoring during operation.

In this case, it would be possible, for example, for the predefined model as a function of the state data to indicate a plausibility range of the sensor data. This means that instead of a precise prediction of the sensor data to be expected, rather a certain range of acceptable sensor data is used. This can make it possible particularly well to separate normal operation from an impairment of the integrity for instance on account of hacking during monitoring.

The method could also comprise obtaining reference state data of the automation system in a learning phase. In this case, the reference state data can describe the operating state of the automation system. The method can also comprise obtaining reference sensor data in the learning phase. The reference sensor data, too, can describe the environmental influence of the automation system. It is then possible to determine an empirical model of the environmental influence, on the basis of carrying out a comparison between the reference state data and the reference sensor data. It is then possible to determine the reference on the basis of the empirical model.

In such an approach, it may be possible flexibly to link together a large number of sources of state data and sensor data by means of the model. In particular, it is possible to link together in particular also such sources for which a deterministic model cannot be derived in a simple manner—particularly modular systems can thus be supported. Something similar may furthermore be the case for example for weakly correlated data. Something similar may furthermore be the case if there is a high dimensionality of different data. Something similar may furthermore be the case if the sensor data are highly noisy, for example, and the signal-to-noise ratio of the sensor data is low.

For example, determining the empirical model could be carried out by means of techniques of machine learning. For example, an artificial neural network could be trained, for instance by means of backpropagation. A Kalman filter could also be used. In this way, determining the model or the reference reliably can be made possible without high complexity and also in a manner flexibly coordinated with the individual case—for instance of a modular system that is frequently extended or modified.

The learning phase can be carried out for example in association with monitored operation. By way of example, it would be possible for access to the automation system by external installations not to be possible during the learning phase. This makes it possible to ensure that even the reference state data or the reference sensor data are not falsified. It would also be possible for the learning phase to be repeated continuously over operation of the automation system. A sudden deviation vis-à-vis the reference for instance on account of hacking could be identified in this way. Furthermore, it is proposed, in the case of an authorized access to one or more components of the automation system, e.g. a change in the project planning (configuration data), in the case of a reconfiguration of a production installation (plug-and-work), or in the case of device firmware being updated, to update the reference model. Furthermore, it is proposed, during such an authorized access, temporarily to halt the method according to embodiments of the invention for monitoring the integrity of the automation system. In another variant, during such an authorized access, the method according to embodiments of the invention carries out monitoring in accordance with a second reference model. The selection of the reference model or the temporary halting can be carried out automatically by the operating mode of the automation system being evaluated (e.g. operative operating mode, maintenance mode, fault mode).

In various examples, it would also be possible for the operation of a further industrial automation system to be monitored. The reference could then be determined on the basis of monitoring the operation of the further industrial automation system. By way of example, corresponding state data and sensor data could also be obtained for the further industrial automation system and a comparison between the state data and the sensor data of the further industrial automation system could be carried out.

By means of such techniques, networking between different automation systems can be utilized in such a way that the compromising of an individual automation system from this group of automation systems can be identified by a comparison with the other automation systems.

Carrying out the comparison between the state data and the sector data can furthermore comprise carrying out an anomaly detection of sensor data correlated with the state data. This means that in the context of a for example machine-trained anomaly detection, it is possible to identify a deviation of an expected pattern of the sensor data on the basis of the state data.

If an impairment of the integrity is ascertained and/or if hacking of the integrity of the automation system is ascertained, various measures can be taken. For example, a signal could be output via a user interface, for example a switching signal or an alarm signal. The automation system or at least components of the automation system can be transferred into a safe state or a protection state automatically or after confirmation by the operating personnel. A log file could also be created, depending on the monitoring. In this case, the log file can correlate a status of the monitoring with serial numbers of products of the automation system. As a result, for a product, even subsequently it is possible to check whether the integrity of the production machines was fulfilled during the production of the product.

In one example, a computer program product (non-transitory computer readable storage medium having instructions, which when executed by a processor, perform actions) comprises program code which can be executed by at least one processor. The execution of the program code has the effect that the at least one processor carries out a method. The method comprises obtaining state data of an industrial automation system. The state data describe the operating state of the automation system. The method furthermore comprises obtaining sensor data describing an environmental influence of the automation system. The method furthermore comprises carrying out a comparison between the state data and the sensor data, and monitoring the integrity of the automation system on the basis of the comparison.

In one example, a computer program comprises program code which can be executed by at least one processor. The execution of the program code has the effect that the at least one processor carries out a method. The method comprises obtaining state data of an industrial automation system. The state data describe the operating state of the automation system. The method furthermore comprises obtaining sensor data describing an environmental influence of the automation system. The method furthermore comprises carrying out a comparison between the state data and the sensor data, and monitoring the integrity of the automation system on the basis of the comparison.

In one example, a control unit comprises at least one processor configured to carry out the following steps: obtaining state data of an industrial automation system, wherein the state data describe the operating state of the automation system; and obtaining sensor data describing an environmental influence of the automation system; and carrying out a comparison between the state data and the sensor data; and on the basis of the comparison: monitoring the integrity of the automation system.

The examples described above can be combined with another in further examples.

BRIEF DESCRIPTION

Figure 2:
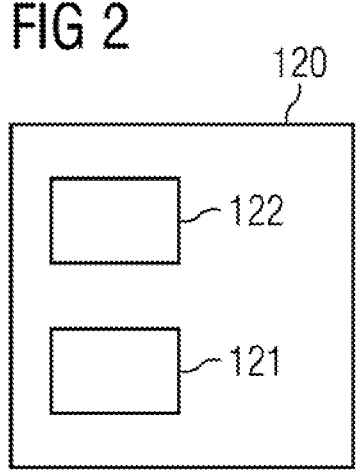

Some of the embodiments will be described in detail, with reference to the following figures, wherein like designations denote like members, wherein:

FIG. 1 schematically illustrates an automation system in accordance with various examples;

FIG. 2 schematically illustrates a control unit of an automation system in accordance with various examples;

FIG. 3 schematically illustrates a control unit in accordance with various examples;

FIG. 4 is a flow diagram of one exemplary method.

Figure 5:
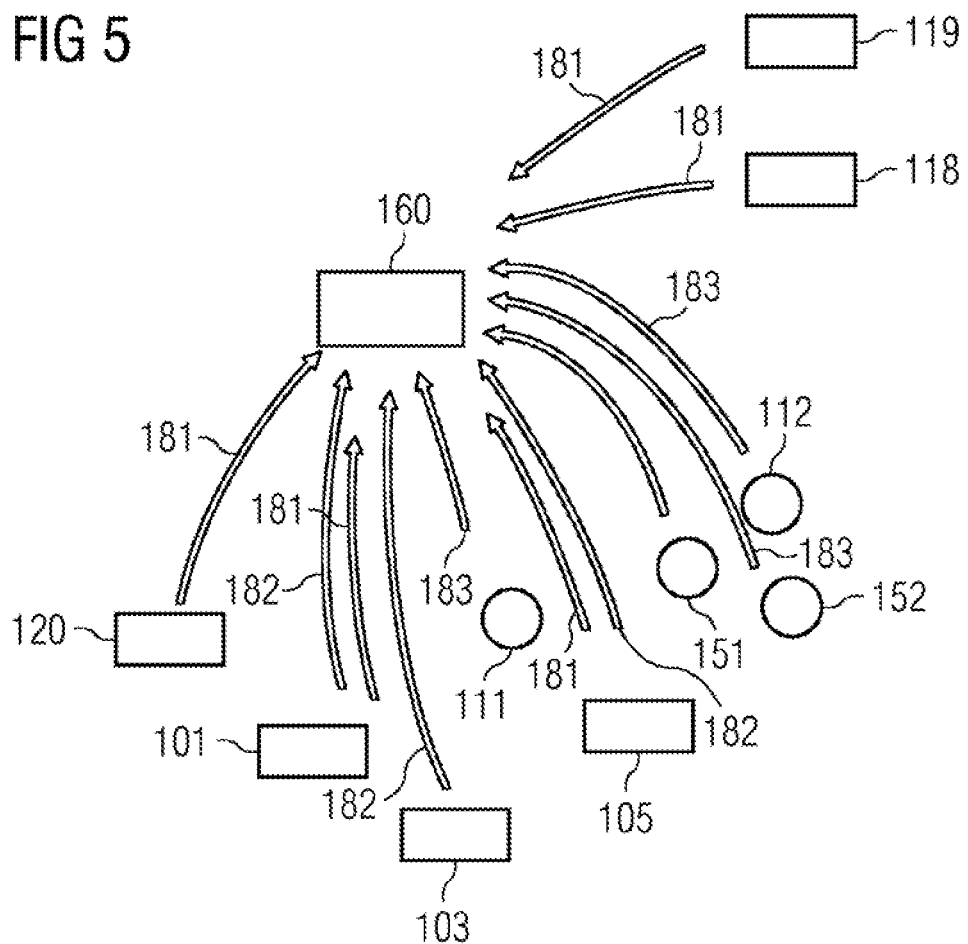
Figure 6:
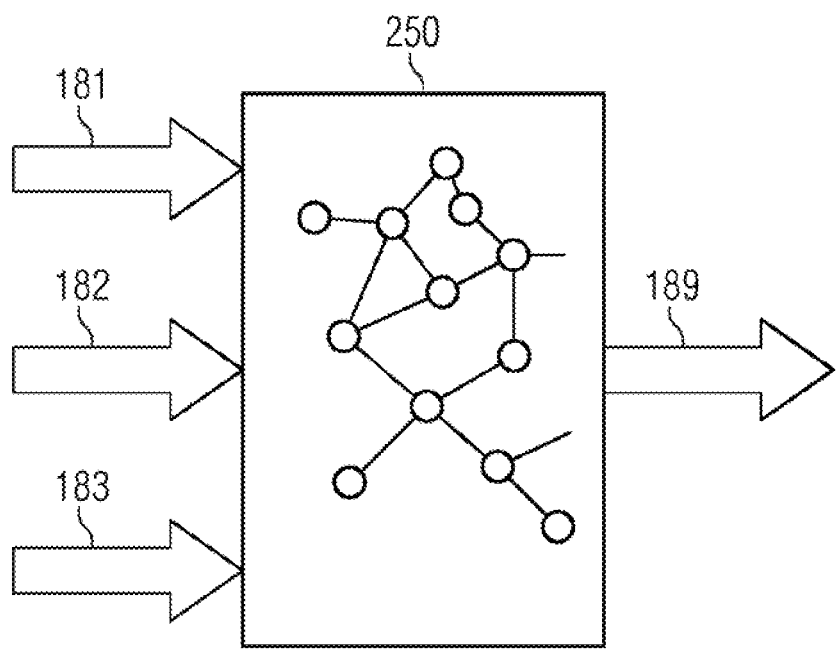

FIG. 5 schematically illustrates the process of obtaining state data, control data and sensor data in accordance with various examples;

FIG. 6 schematically illustrates the process of comparing state data, control data and sensor data by means of a model in accordance with various examples.

FIG. 7 illustrates a schematic time profile of a component activity—described by exemplary state data—of a component of an automation system and also of an environmental influence of the automation system, which correlates with the component activity;

FIG. 8 schematically illustrates reference state data, reference control data and reference sensor data in accordance with various examples; and FIG. 9 schematically illustrates state data, control data and sensor data of a plurality of automation systems in accordance with various examples.

DETAILED DESCRIPTION

The above-described properties, features and advantages of embodiments of this invention and the way in which they are achieved will become clearer and more clearly understood in association with the following description of the exemplary embodiments which are explained in greater detail in association with the drawings.

The following is explained in greater detail below on the basis of preferred embodiments with reference to the drawings. In the figures, identical reference signs designate identical or similar elements. The figures are schematic representations of various embodiments of the invention. Elements illustrated in the figures are not necessarily illustrated in a manner true to scale. Rather, the various elements illustrated in the figures are rendered in such a way that their function and general purpose become comprehensible to the person skilled in the art. Connections and couplings between functional units and elements that are illustrated in the figures can also be implemented as indirect connection or coupling. A connection or coupling can be implemented in a wired or wireless manner. Functional units can be implemented as hardware, software or a combination of hardware and software.

Techniques for monitoring the integrity of industrial automation systems are described below. An impairment of the integrity may be caused by various reasons. One exemplary reason for the impairment of the integrity is hacking of the corresponding automation system, that is to say in particular unauthorized hacking.

The techniques described herein are based on a combined monitoring of state data describing an operating state of the automation system, and sensor data describing an environmental influence of the automation system. By way of example, the expected environmental influence in the normal case can be derived from the state data. Such modelling information can then be used to realize a comparison of the actual behavior with the expected behavior and to ascertain integrity changes by this means.

The techniques described herein are based, in various examples, on jointly taking account of and evaluating sensor data and state data—which are IT-related, for example. It is possible to carry out a check for consistency or plausibility from a comparison of the sensor data with the state data. This results in a new quality of the integrity monitoring since, for example, manipulations on sensors or actuators can also be identified. Furthermore, a high robustness is achieved since an unnoticed attack would necessitate consistent manipulation of a multiplicity of integrity data on different systems simultaneously. Furthermore, different kinds of impairment of integrity—for example manipulation of sensors or actuators, manipulation of the cabling, manipulation of configuration data, manipulation of firmware, manipulation of the control communication, etc.—can be jointly detected and processed. Impairments of the integrity of automation systems of different kinds can be identified as a result. The integrity monitoring techniques described herein in this case in particular do not just relate to specific IT partial functions of components of an automation system, but rather concern a comprehensive approach.

The techniques described herein can be scaled flexibly. Extensibility is afforded. Additional sensor data and/or state data can be taken into account flexibly as required. Moreover, it is possible to monitor critical areas of an automation system with greater effort than comparatively noncritical areas. By way of example, for critical areas more sensor data or state data could be obtained, for instance per unit time.

The techniques described herein also enable the retrofitting of existing automation systems. For example, in a targeted manner, additional sensors could be used for providing sensor data. This makes it possible to continue to use fundamentally unprotected operating software, automation components and machine tools or production systems. In general, it is possible to continue to use components of an automation system which themselves have no, or only insufficient, protection against hacking.

On the basis of the present techniques it would be possible, for example, to generate a log file that logs the result of the monitoring. By way of example, time stamps could be used. This information could then be used to monitor batches of produced products of the automation system with regard to impairment of the integrity. In this way, it is possible to check, even subsequently, whether the integrity of individual batches of products could be influenced, for instance on account of impermissible or even unauthorized hacking.

Unauthorized hacking is often characterized by an automation system being modified in an impermissible manner. This can also be effected by users who have access authorization, e.g. to a service mode, to a component of the system, and can modify e.g. the firmware or the project planning data of a component. The solution according to embodiments of the invention improves resilience since it is possible to identify even impermissible changes in the installation configuration which are effected by service technicians or by way of weakly protected or unprotected service interfaces.

FIG. 1 schematically illustrates aspects with regard to an automation system 100. The automation system 100 comprises a multiplicity of components 101-106, 111-112, 118-119, 120. The components can also be referred to as devices of the so-called Internet of Things (IoT).

By way of example, the components 101-106 could implement actuators which bring about an environmental influence. Such an environmental influence could be for example the operation of a production line or the control of traffic control systems.

By way of example, the components 111-112 could denote sensors which at least partly measure the environmental influence of the actuators 101-106.

By way of example, the components 118-119 could implement control functionality for controlling one or a plurality of the further components 101-106, 111-112; this means that the components 118-119 can provide resources of computer hardware. A central control unit 120 is provided as well.

Moreover, external sensors 151, 152 are also illustrated in association with FIG. 1; these sensors 151, 152 are in this respect not part of the automation system 100 since they are not in a communication connection with the other components 101-106, 111-112, 118-120. Such sensors 151, 152 could for example be installed specifically with the objective of integrity monitoring and for example be fitted in a physically protected manner. This has the advantage that such a sensor 151, 152 cannot be manipulated by a compromised automation component via the communication connection. In one variant, these system-independent sensors can be given a different weighting in the evaluation.

FIG. 1 illustrates that hacking 90 of the integrity of the automation system 100 can take place. By way of example, the hacking 90 could have the aim of impairing the functioning of the automation system 100. The hacking 90 can be impermissible or even unauthorized.

Techniques are described below which make it possible to identify and, if appropriate, to repel such hacking 90.

Corresponding logic can be implemented for example in association with a control unit 160. In the scenario in FIG. 1, the control unit 160 is in turn not part of the automation system 100. For example, the controller 160 could be part of a backend system. For example, cloud computing or edge computing could be used for the operation of the control unit 160.

FIG. 2 illustrates aspects with regard to the central control unit 120. In some examples, the control unit 120 could also be configured to implement the monitoring of the integrity. The control unit 120 comprises at least one processor 121, for example a multi-core processor. A memory 122 is provided. Program code could be stored in the memory 122. The processor 121 can load the program code from the memory 122 and execute it. The execution of the program code can have the effect that the central control unit 120 implements techniques in association with one or more of the following elements: obtaining and/or analyzing state data of the automation system 100; obtaining and/or analyzing sensor data describing an environmental influence of the automation system; carrying out a comparison between the state data and the sensor data; and monitoring the integrity of the automation system; and monitoring hacking of the automation system, for instance with the aim of impairing or violating the integrity.

FIG. 3 illustrates aspects with regard to the backend control unit 160. The control unit 160 comprises at least one processor 161, for example a multi-core processor. A memory 162 is provided. Program code could be stored in the memory 162. The processor 161 can load the program code from the memory 162 and execute it. The execution of the program code can have the effect that the control unit 160 implements techniques in association with one or more of the following elements: obtaining and/or analyzing state data of the automation system 100; obtaining and/or analyzing sensor data describing an environmental influence of the automation system; carrying out a comparison between the state data and the sensor data; and monitoring the integrity of the automation system.

FIG. 4 is a flow diagram of one exemplary method. By way of example, the method in accordance with the example in FIG. 4 could be carried out by the control unit 120 or by the control unit 160.

Firstly, in block 1001, state data are obtained. The state data describe the operating state of an automation system. By way of example, the state data could be obtained from one or a plurality of control units of the automation system or else directly from actuators or sensors of the automation system.

For example, the state data could comprise a state of operating software of the automation system. The state data could comprise at least one element of the following group: a component registration of a multiplicity of active components of the automation system; and a component activity of a multiplicity of components of the automation system; an error state of operating software of the automation system; a parameter of a communication interface of the automation system; and a resource allocation of computer hardware of the automation system.

By way of example, the component registration could list all active components registered at a central control unit of the automation system. Logged-off components can be correspondingly listed. As a result, it is possible to obtain an overview of which components of the automation system can in principle perform an environmental influence.

By way of example, the component activity could denote a degree of capacity utilization or an operating cycle of different components. By way of example, an amplitude of the activity could be described in association with actuators. In this way, it may be possible to estimate an intensity of the environmental influence on account of actuators of the automation system.

The error state can correspond for example to a log file of the operating software. Unexpected terminations of program software, for example, can be stored therein. Erroneous memory accesses could also be stored. Instances of repelled hacking could also be stored. All processes carried out could also be represented.

The parameter of the communication interface of the automation system can indicate for example an activity of the communication interface and possible communication partners. By way of example, the volume of data exchanged could be stored. By way of example, an encryption used could be indicated. By way of example, the active communication connections and the associated applications could be stored.

The resource allocation of the computer hardware can describe for example a capacity utilization of the memory or a capacity utilization of read only memory or a capacity utilization of available processors.

In block 1002, sensor data are obtained. By way of example, the sensor data can be obtained from one or a plurality of sensors of the automation system. Alternatively or additionally, it would also be possible for the sensor data to be obtained from one or a plurality of external sensors. The sensor data can quantify a physical measurement variable or observable. The measurement variable can describe an environmental influence of the automation system. By way of example, one or more of the following physical observables could be described by the sensor data: temperature; traffic flow; products produced; rejects; pressure; volume; speed; position; current; voltage; electrical energy generated; etc.

Block 1003 then involves carrying out a comparison between the state data from block 1001 and the sensor data from block 1002. By way of example, a correlation between the state data and the sensor data could be carried out. A fusion of the sensor data and state data could be carried out.

In principle, further data could also be taken into account in the context of the comparison in block 1003. For example, it would be possible also to obtain control data for one or a plurality of actuators of the automation system which bring about the environmental influence. The control data could then also be taken into account during the comparison in block 1003.

A deviation of the environmental influence from a reference could be taken into account during the comparison. The reference can be determined depending on the state data. In this case, for example, a deterministic model or else an empirical model could be used.

Finally, in block 1005 (optionally) countermeasures and/ or warnings can be initiated depending on the monitoring from block 1004. By way of example, a log file could be created depending on the monitoring, the log file correlating the status of the monitoring with serial numbers of products of the automation system. In this way, even subsequently, a check could be made to establish whether possibly individual products or batches of products were influenced by the impairment of the integrity. It would also be possible, depending on the monitoring, to output a warning via a user interface and/or to transfer operation of the automation system automatically into a protection state. By way of example, it might be possible to limit the environmental influence in the protection state, such that persons, etc. cannot be harmed. It would also be possible to deactivate a communication interface of the automation system 100, such that possible hacking cannot actively be carried out.

FIG. 5 schematically illustrates aspects with regard to fusion of different data of the automation system. It is evident from FIG. 5 that state data 181 and/or control data 182 are obtained from a subset of the actuators 101, 103, 105. The state data 181 can describe an operating state of the respective actuator 101, 103, 105. The control data 182 can describe a manner and/or an intensity of the environmental influence of the respective actuator 101, 103, 105.

Moreover, sensor data 183 are obtained from the sensors 111, 112, 151, 152. The sensor data describe the environmental influence of the automation system 100.

In the example in FIG. 5, furthermore, state data 181 are acquired from the hardware resources 118, 119. Moreover, state data 181 are acquired from the central control unit 120.

All these data 181, 182, 183 are provided to the control unit 160. The latter can then carry out fusion of the data, i.e. a comparison between the different data 181, 182, 183. The integrity of automation systems can be monitored on the basis of this comparison. That is also illustrated in association with FIG. 6.

FIG. 6 illustrates aspects with regard to comparing the different data 181, 182, 183. FIG. 6 illustrates in particular a functioning of, for example, the control unit 160 or the control unit 120 with regard to monitoring the integrity, wherein for instance impairments of the integrity on account of impermissible or even unauthorized hacking 90 can be identified.

It is evident from FIG. 6 that a model 250 is used for the comparison. A result signal 189 is obtained as the result. The result signal 189 can be indicative for example of whether or not an impairment of the integrity and/or hacking 90 are/is present. The result signal 189 could indicate a corresponding probability. The result signal can initiate warnings and/or countermeasures.

In some examples, a deterministic model 250 can be used. The deterministic model 250 can be predefined and can be created for example on the basis of physical relationships and/or the architecture of the automation system 100. It would be possible, for example, for the model 250 as a function of the state data 181 to indicate a plausibility range of sensor data. In the context of the comparison, it is then possible to check whether the sensor data indicate an environmental influence within the plausibility range; if this is not the case, an impairment of the integrity can be assumed. Such techniques are illustrated in association with FIG. 7.

FIG. 7 illustrates aspects with regard to comparing state data 181 and sensor data 183. By way of example, corresponding functioning could be implemented by the model 250.

In the example in FIG. 7, the state data 181 indicate the activity 301 of an actuator as a function of time. In the example in FIG. 7, the activity of the actuator 301 fluctuates between two values (solid line).

FIG. 7 also illustrates the reference 310 obtained on the basis of the model 250 based on the activity 301 (dotted line). A corresponding plausibility range 311 is hatched. A deviation from the plausibility range 311 could be identified for instance in association with an anomaly detection.

FIG. 7 furthermore illustrates the time profile of the environmental influence 306 measured by the sensor data 183, for example of the temperature in the surroundings of the corresponding actuator. It is evident that, starting from a certain point in time, the distance 312 between the measured environmental influence 306, on the one hand, and the reference 310, on the other hand, leaves the plausibility range 311; there it is possible to assume an impairment of the integrity for instance on account of hacking 90.

A corresponding model 250 can be derived not just deterministically, e.g. by means of a digital twin simulation model created during the design of a machine or installation. Techniques of machine learning could also be used. This is illustrated in association with FIG. 8.

FIG. 8 illustrates aspects with regard to determining the reference 310 or the model 250. FIG. 8 illustrates that the data 181, 182, 183 are obtained from the system 100 or the sensors 151, 152 during an operating phase 191. The monitoring of the integrity is carried out during the operating phase.

Reference state data 181A, 181B and reference sensor data 183A, 183B are obtained during two learning phases 192, 193. Optionally, reference control data 182A, 182B can also be obtained. In general, only one learning phase is required.

By way of example, the learning phase 193 could be defined in association with a rollout of the automation system 100. Monitored operation can be effected there. The learning phase 192 could correspond to normal operation of the automation system 100, i.e. describe historical data 181A, 182A, 183A.

It is then possible for an empirical model 250 to be determined on the basis of a comparison between these reference data 181A, 182A, 183A, 181B, 182B, 183B. The reference 310 can then be determined in particular as a deviation with respect to normal operation. Complex determination of a deterministic model is obviated. Moreover, different sources of the data can be taken into account flexibly, thereby fostering extensibility of the model 250. For example, the model 250 could be empirically determined by means of techniques of machine learning.

As an alternative or in addition to such definition of reference data in the time period with regard to the learning phases 192, 193, it would also be possible to derive the reference 310 from the operation of a further automation system. Corresponding techniques are illustrated in association with FIG. 9.

FIG. 9 illustrates aspects with regard to determining the reference 310 or the model 250. FIG. 9 illustrates that besides the monitoring of the operation of the automation system 100, the operation of a further automation system 100' can also be monitored. Corresponding reference state data 181', reference control data 182' and reference sensor data 183' can be obtained from the further automation system 100'. The reference 310 can be determined in this way.

It goes without saying that the features of the above-described embodiments and aspects of the invention can be combined with one another. In particular, the features can be used not only in the combinations described, but also in other combinations or by themselves, without departing from the scope of embodiments of the invention.

For example, the techniques described herein can also be used for monitoring the integrity of other systems, e.g. generally of sensor-actuator systems, for instance autonomous machines, etc.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method, comprising:
   obtaining state data of an industrial automation system, wherein the state data describes a current operating state of a respective actuator of the industrial automation system and is recorded in one or more log files;
   obtaining sensor data describing an environmental influence of the industrial automation system, wherein the sensor data quantifies a physical measurement;
   obtaining control data for one or a plurality of actuators of the industrial automation system which bring about the environmental influence, wherein the control data describes a manner and/or an intensity of the environmental influence of the respective actuator; and
   carrying out a comparison between the state data, the sensor data, and the control data using a model to output a result signal indicative of a probability of an impairment to an integrity of the industrial automation system, wherein the model is empirically determined by means of techniques of machine learning;
   wherein the comparison takes account of a deviation of the environmental influence from a reference obtained on a basis of the model.

2. The method as claimed in claim 1, wherein the state data comprise a state of operating software of the industrial automation system.

3. The method as claimed in claim 1, wherein the state data comprise at least one element of:
   a component registration of a multiplicity of active components of the industrial automation system;
   a component activity of a multiplicity of components of the industrial automation system;
   an error state of operating software of the industrial automation system;
   a parameter of a communication interface of the industrial automation system; and
   a resource allocation of computer hardware of the industrial automation system.

4. The method as claimed in claim 1, further comprising:
   determining the reference on the basis of the model and as a function of the state data.

5. The method as claimed in claim 4, wherein the model is a predefined deterministic model and as a function of the state data indicates a plausibility range of the sensor data.

6. The method as claimed in claim 1, further comprising:
   obtaining reference state data of the industrial automation system in a learning phase,
   wherein the reference state data describe the operating state of the industrial automation system,
   obtaining reference sensor data in the learning phase,
   wherein the reference sensor data describe the environmental influence of the industrial automation system,
   determining an empirical model of the environmental influence on a basis of carrying out a comparison between the reference state data and the reference sensor data; and
   determining the reference on a basis of the empirical model.

7. The method as claimed in claim 6, wherein determining the empirical model is carried out by machine learning.

8. The method as claimed in claim 1, comprising:
   monitoring the operation of a further industrial automation system,
   determining the reference on a basis of monitoring the operation of the further industrial automation system.

9. The method as claimed in claim 1, wherein carrying out the comparison comprises carrying out an anomaly detection of sensor data correlated with the state data.

10. The method as claimed in claim 1, further comprising:
    depending on the monitoring, creating a log file that correlates a status of the monitoring with serial numbers of products of the industrial automation system.

11. The method as claimed in claim 1, further comprising:
    depending on the monitoring, outputting a warning via a user interface and/or transferring operation of the industrial automation system into a protection state.

12. The method as claimed in claim 1, wherein the physical measurement is a temperature, a traffic flow, products produced, products rejected, a pressure, a volume, a speed, a position, a current, a voltage, or an electrical energy generated.

13. A computer program comprising program code stored in at least one memory which can be executed by at least one processor and which has the effect that the at least one processor carries out the method as claimed in claim 1.

14. A control unit comprising at least one hardware processor and at least one memory storing executable instructions, the at least one hardware processor configured to:
    obtain state data of an industrial automation system, wherein the state data describes a current operating state of a respective actuator of the industrial automation system and is recorded in one or more log files;
    obtain sensor data describing an environmental influence of the industrial automation system, wherein the sensor data quantifies a physical measurement;
    obtain control data for one or a plurality of actuators of the industrial automation system which bring about the environmental influence, wherein the control data describes a manner and/or an intensity of the environmental influence of the respective actuator;

compare the state data, the sensor data, and the control data using a model to output a result signal indicative of a probability of an impairment to an integrity of the industrial automation system, wherein the model is empirically determined by means of techniques of machine learning;

wherein the comparison takes account of a deviation of the environmental influence from a reference obtained on a basis of the model.

15. A method, comprising:

obtaining state data of an industrial automation system, wherein the state data describes an operating state of the industrial automation system;

obtaining sensor data describing an environmental influence of the industrial automation system;

obtaining control data for one or a plurality of actuators of the industrial automation system which bring about the environmental influence; and carrying out a comparison between the state data, the sensor data, and the control data using a model to output a result signal indicative of a probability of an impairment to an integrity of the industrial automation system;

wherein the comparison takes account of a deviation of the environmental influence from a reference obtained on a basis of the model;

wherein the method further comprises:

obtaining reference state data of the industrial automation system in a learning phase, wherein the reference state data describe the operating state of the industrial automation system, obtaining reference sensor data in the learning phase, wherein the reference sensor data describe the environmental influence of the industrial automation system, determining an empirical model of the environmental influence on a basis of carrying out a comparison between the reference state data and the reference sensor data; and determining the reference on a basis of the empirical model.

\* \* \* \* \*